United States Patent
McDonald

(10) Patent No.: US 6,957,366 B1
(45) Date of Patent: Oct. 18, 2005

(54) SYSTEM AND METHOD FOR AN INTERACTIVE WEB-BASED DATA CATALOG FOR TRACKING SOFTWARE BUGS

(75) Inventor: Steven L. McDonald, Stockbridge, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 558 days.

(21) Appl. No.: 09/966,245

(22) Filed: Sep. 28, 2001

(51) Int. Cl.[7] .............................................. G06F 11/00
(52) U.S. Cl. ........................................ 714/38; 717/124
(58) Field of Search ............................... 714/38, 39, 45, 714/46; 717/124, 125, 126, 127, 128

(56) References Cited

U.S. PATENT DOCUMENTS

| | | | |
|---|---|---|---|
| 5,155,837 A | * | 10/1992 | Liu et al. ..................... 709/221 |
| 6,546,547 B1 | * | 4/2003 | Runyan et al. ............. 717/124 |
| 2002/0107809 A1 | * | 8/2002 | Biddle .......................... 705/59 |
| 2003/0110248 A1 | * | 6/2003 | Ritche ......................... 709/224 |
| 2004/0015868 A1 | * | 1/2004 | Dutta et al. ................. 717/126 |
| 2004/0015950 A1 | * | 1/2004 | Dutta et al. ................. 717/171 |

* cited by examiner

Primary Examiner—Dieu-Minh Le
(74) Attorney, Agent, or Firm—Woodcock Washburn LLP

(57) ABSTRACT

A system and method for updating a software acceptance testing database via a communications network is disclosed. A database maintained at a server is accessed by remote users via a restricted communications network. Mobile personnel log trouble tickets, the software vendor assigns the trouble ticket to a resolution entity, the software purchaser is notified when the problem is to be fixed, the problem is retested and the results of the retest are logged. For future releases of the software, a field is included in the database for trouble items that will be included in future regression testing procedures.

18 Claims, 5 Drawing Sheets

Figure 3

| Ticket # 402 | Text ID 404 | TR # 406 | Tester 408 | Test Commands 410 | Status 412 | Resolution 414 | Assigned To 416 | Fix Date 418 | Sev 420 |
|---|---|---|---|---|---|---|---|---|---|
| 211590 | 6.4.24 | EMR BS-00313-04 | Robert | 11/13/00slm Change staus from "Enhancement Request" to "Change to Fail". This is a usability issue *********** ON CREATING USER SESSION/ THE CONFIGURATION CODE, THE SIGNALLING FORMAT AND THE SIGNALLING OPERATION SHOULD BE FORMATTED ON THE DROP DOWN MENU IN NUMERICAL ORDER FIRST AND THEN BY ALPHABETICAL ORDER. | Change to Fail | Send to CSCC 11/7/00. Enhancement by Telcordia 11/8/00 BS-00313-04 | CSCC | 1/1/02 | 3 |

400

SYSTEM AND METHOD FOR AN INTERACTIVE WEB-BASED DATA CATALOG FOR TRACKING SOFTWARE BUGS

FIELD OF THE INVENTION

This invention relates to the field of database systems and in particular to updating a software acceptance testing database via a communications network.

BACKGROUND

Companies such as telecommunications companies frequently purchase software, including custom software, from software development companies and other vendors. Furthermore, vendors typically release new versions of software periodically. Whenever a company considers adopting a new package or version, naturally, the company wants to be reasonably certain that the software is stable and performs the tasks that the software is supposed to perform. Hence, pre-acceptance testing is a critical part of the process of acquiring new software and new versions of software.

Typically, especially for large, custom software systems, a development version of the software will be loaded on the client system in order for the client to test the software in the environment in which the software will be used. Keeping track of identifying functions to test, assigning the testing of the functions to suitable personnel, recording the results of testing, notifying the vendor of continuing malfunctions in the software, notifying the vendor of new malfunctions in the software, receiving notification from the vendor that a malfunction has been fixed, re-testing the function, and finally closing out a function test after successful testing, can be a daunting task. When the players involved in the process are geographically separate, the task can approach gargantuan.

A database such as a MICROSOFT ACCESS database could be built to track these and other data categories and each member of the testing team could be provided with a copy of the tracking database. However, when anyone involved in the testing process updates the tracking database, a new copy of the database would have to be provided to each member of the testing team. Problems are likely to arise with keeping all the different copies of the database in sync.

For example, suppose that all the members of a testing team have the same version of a tracking database, version A. Imagine now that a client technician (tester) enters a new trouble ticket to database A, creating version A' and e-mails the new database A' to all the members of the testing team. Suppose that, at about the same time, a software developer fixes a software bug and enters a notation of the fix in database A, creating version A", and sends all the members of the testing team his new A" database. Now the members of the testing team will have two updated versions of the A database. Selection of the A' database as the "new" database will result in the loss of the software bug fix notation while selection of the A" database as the "new" database will result in the loss of the new trouble ticket.

It is clear that keeping multiple copies of a shared database consistent between geographically diverse users is problematic. Hence, a need exists in the art to have a single shared database accessible by multiple geographically diverse users.

SUMMARY OF THE INVENTION

The present invention discloses a system and method for creating and maintaining a database accessible by means of a restricted network communications system, such as an intranet. When a new software package or release is received, and is loaded onto a client development device, a database is created for tracking functions to test and for logging problems found. The database may include fields such as but not restricted to: test identifier, tester, ticket number, status, date of test, severity level of problem, test comments, tracking number, resolution, fix date, assigning entity, version, and assigned to.

A number of reports are available, such as but not restricted to: All Tests, All Test Failures, All "Change to Fail" Results, All Passing Tests, Vendor Tracking Numbers, ReTest Pass Results, Needs ReTest Results, Fail for Review, Group Test, Enhancement Requests, Needs Team Review, Everything BUT Pass, Status Equals, Duplicate, Individual Results, Usability Issues, ReTest Pass by Group, ReTest Fail, Scripting and Enhancement.

A number of Search Inquiries as well as a "Build your own query" are also available, such as but not restricted to: Tickets not Picked up, No Fix Date, Locate by Test Id, Locate by Ticket, Locate by Tester.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 3 is an exemplary display of elements of the database in accordance with one embodiment of the invention;

DETAILED DESCRIPTION OF THE INVENTION

The present invention may be deployed as part of a computer network.

Figure 1:
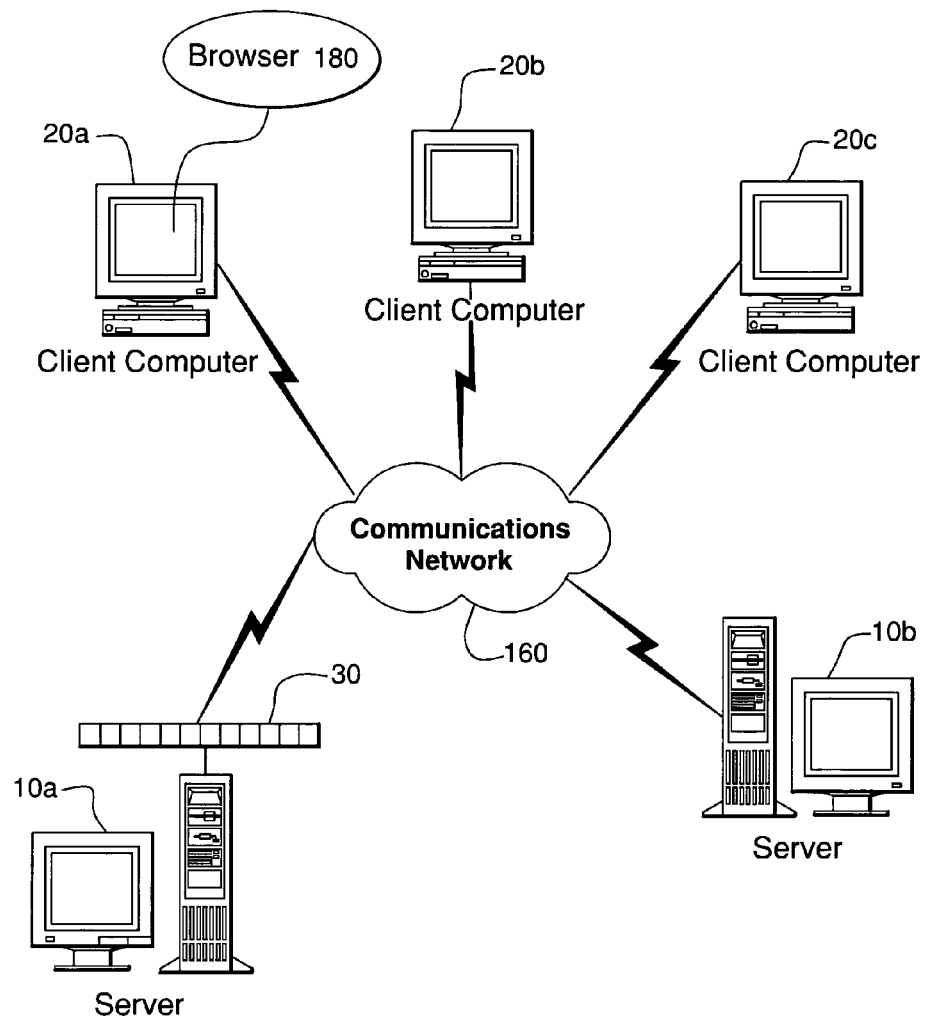
FIG. 1 is a block diagram of an exemplary network environment in which aspects of the invention may be implemented.

In general, the computer network may comprise both server computers and client computers deployed in a network environment. FIG. 1 illustrates an exemplary network environment, with a server in communication with client computers via a network, in which the present invention may be employed. As shown in FIG. 1, servers 10a, 10b, etc. are interconnected via a communications network 160 (which may be a LAN, WAN, intranet or the Internet) with a number of client computers 20a, 20b, 20c, etc. In a network environment in which the communications network 160 is the Internet, for example, the servers 10a, 10b, etc. can be Web servers with which the clients 20a–c, etc. communicate via any of a number of known protocols such as hypertext transfer protocol (HTTP). Each client computer 20*a–c*, etc. can be equipped with a browser 180 to gain access to servers 10*a*, 10*b*, etc. At least one of servers 10*a*, 10*b*, etc., for example, server 10*a*, may be communicatively coupled to a firewall 30. Firewall 30 may be a hardware device or may be software that acts as a filter so that only authorized clients 20*a*, 20*b*, 20*c* can access server 10*a* or can access a portion of server 10*a*.

Software Acceptance/Regression Testing Method

Figure 2:
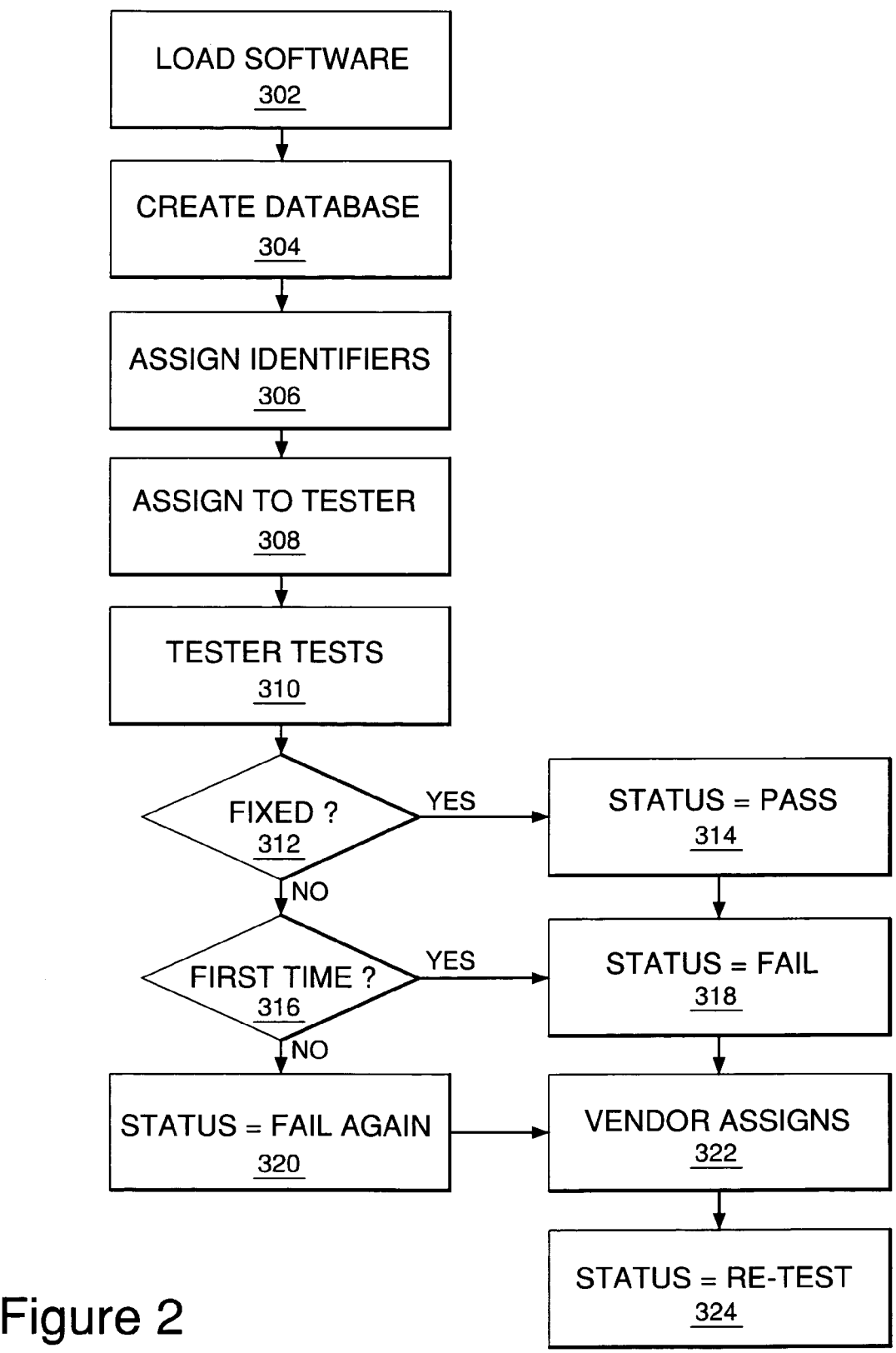
FIG. 2 is a flow diagram of a method of tracking software function testing in accordance with one embodiment of the invention.

FIG. 2 illustrates a flow diagram of a software acceptance/regression testing method in accordance with one embodiment of the invention. At step 302 software for which acceptance/regression testing is to be performed may be loaded into a client development area for testing. Alternatively, software located elsewhere, (such as, for example, on a vendor's server) could be made accessible to the client through other means, such as by giving client access to the software maintained on a vendor's server.

At step 304 a database or databases may be created for tracking functions to test and for logging problems found. The database may include fields such as but not restricted to: test identifier, tester, ticket number, status, date of test, severity level of problem, test comments, vendor tracking number, resolution, fix date, assigning entity, version, and assigned to. Alternatively, such a database may already exist, as when testing a new release of software.

In a preferred embodiment the software acceptance/regression testing application is developed using ACTIVE SERVER PAGES (ASP). ASP is a web server technology from MICROSOFT that enables the creation of dynamic, interactive sessions with the user and allows web pages to interact with databases and other programs. An ASP is a web page that contains HTML and embedded programming code written in programming languages such as VBScript or Jscript. It was introduced with Version 3.0 of Microsoft's Internet Information Server (IIS). When IIS encounters an ASP page requested by the browser, it executes the embedded program. In an alternate embodiment CGI scripts and JavaServer Pages (JSPs) or the like are used to create the application.

Typically, the vendor provides the client with a list of functions to be tested, although, alternately, the client could prepare a list of functions to be tested, preferably from a list of requirements for the software provided to the vendor by the client. The list of functions is entered into a software acceptance/regression testing database, preferably by the client, at step 304, although, alternatively, the vendor could enter the functions to be tested into the database.

An exemplary display of elements in a software acceptance/regression testing database is illustrated in FIG. 3. It should be understood that screen 400 is merely exemplary and the present invention is in no way limited to the particular items or category of items displayed on the screen.

In a preferred embodiment, each function to be tested is assigned a ticket number 402, (e.g. 211590) at step 306. Preferably ticket number 402 is assigned automatically by the testing software and preferably is automatically incremented by one by the system, for each new function to be tested, although random ticket numbers may alternately be generated. Alternately, ticket numbers may be assigned manually. Each function to be tested is assigned a test identification code, ("test id") 404, (e.g. 6.4.24) which, in a preferred embodiment, represents a reference number associated with compliance tracking. (For example, 6.4.24 may refer to a section heading of a requirements document.)

The function to be tested is also assigned a transaction record number 406 which is a tracking number used by the vendor. Vendor tracking number may be used to signify to the client that the vendor has assigned the trouble ticket to a vendor technician (employee) and that the trouble ticket will be tracked by the vendor internally. Alternately, a client may examine the "assigned to" field for indication that the trouble ticket was assigned to a vendor technician.

The status field 412 is set to "Test". Allowable values for the status field are: Test, Fail, Fail Again, Change to Fail, ReTest, Duplicate and Pass. These options are presented to the user for selection in a drop down box.

In the Test Comments field 410, a description of the function to be tested may be entered. For example, the Test Comments field 410 may read, "THE CONFIGURATION CODE, THE SIGNALLING FORMAT AND THE SIGNALLING OPERATION SHOULD BE FORMATTED ON THE DROP DOWN MENU IN NUMERICAL ORDER FIRST AND THEN BY ALPHABETICAL ORDER."

The function to be tested is also assigned a severity level in severity level field 420. In a preferred embodiment, a severity level 1 represents "must be fixed before software will be accepted". A severity level 2 represents "very serious error" and a severity level 3 represents an error that "should be fixed but is not critical".

A resolution field 414 is included that describes how the problem was addressed, for example, an exemplary resolution field 414 may contain the message, "Send to CSCC Nov. 7, 2000. Enhancement by Vendor Nov. 8, 2000 CL-00313-04".

An exemplary "assigned to" field 416 may contain "CSCC" representing a group in Vendor to whom responsibility for correcting the function is assigned. "Fix Date" field 418 represents a date (e.g. Jan. 1, 2002) by which the correction is estimated to be complete.

Preferably, the client project manager or other appropriate personnel, assigns functions to be tested to technicians by logging into the system and entering a technician name in Tester field 408 in step 308. For example, to assign a function to test (e.g. Ticket # 211590) to technician "Robert", "Robert" would be placed in tester field 408.

Typically each individual technician is assigned a number of functions to test. To locate the functions assigned to a particular technician, the technician, after logging into the system, may choose an option to display or print all functions assigned to him to test. For example, if a technician, Robert, wants to obtain a list of functions assigned to him, Robert could select a query "Locate by Tester" to query the database for "tester='Robert'" and would be provided with a list of functions that technician Robert is supposed to test.

As the technician tests the assigned functions at step 310, the technician enters the results of the function test into status field 412 by selecting one of the options in the drop-down box. If the function operates correctly, (step 312), the technician selects "Pass" from the drop-down box at step 314. If this is the first time the function is being tested and the function malfunctions, the technician chooses "Fail" at step 318. If this is not the first time the function malfunctioned, the technician chooses "Fail Again" at step 320.

A designation of "Change to Fail" may represent a situation in which a software fix originally considered an enhancement is subsequently classified as a malfunction.

The technician may also enter comments into the function test comments field 410. For example, the technician may enter "11/13/00slm Change status from "Enhancement Request" to "Change to Fail". This is a usability issue."

Status field 412 is preferably closely monitored by both vendor and client. A vendor can ascertain functions that have been tested, but which still malfunction by querying the database for "Status='Fail again'". A list of tickets with status equal to "Fail again" will be displayed and can be printed. A vendor employee or person charged with managing work assignment, can pick off the ticket number of the function that "Failed again" and then pick "UPDATE Ticket" to update the resolution field and fix date field. The vendor employee may also e-mail or otherwise notify the vendor employee assigned to fixing the malfunction at step 322. When a vendor employee fixes the problem, the vendor employee, or alternately a person charged with managing the portions of the database that the vendor updates, can update the status field to "Retest" at step 324. Assignment of the value "Retest" to the status field 412 is a signal to the client technician assigned to testing that function, (e.g. "Robert"), that he or she should test the function again.

Figure 4:
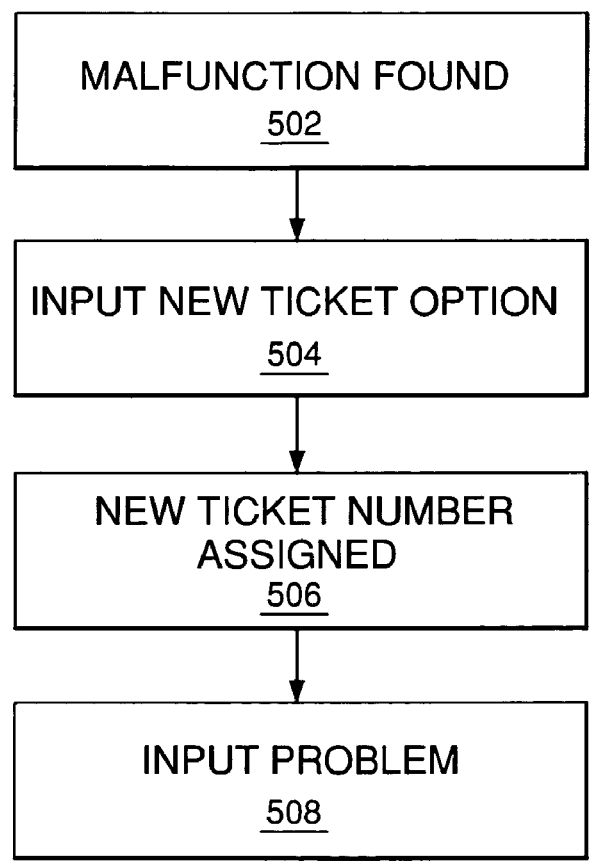
FIG. 4 is a flow diagram of a method of entering a new function to be tested in accordance with one embodiment of the invention.
Figure 5:
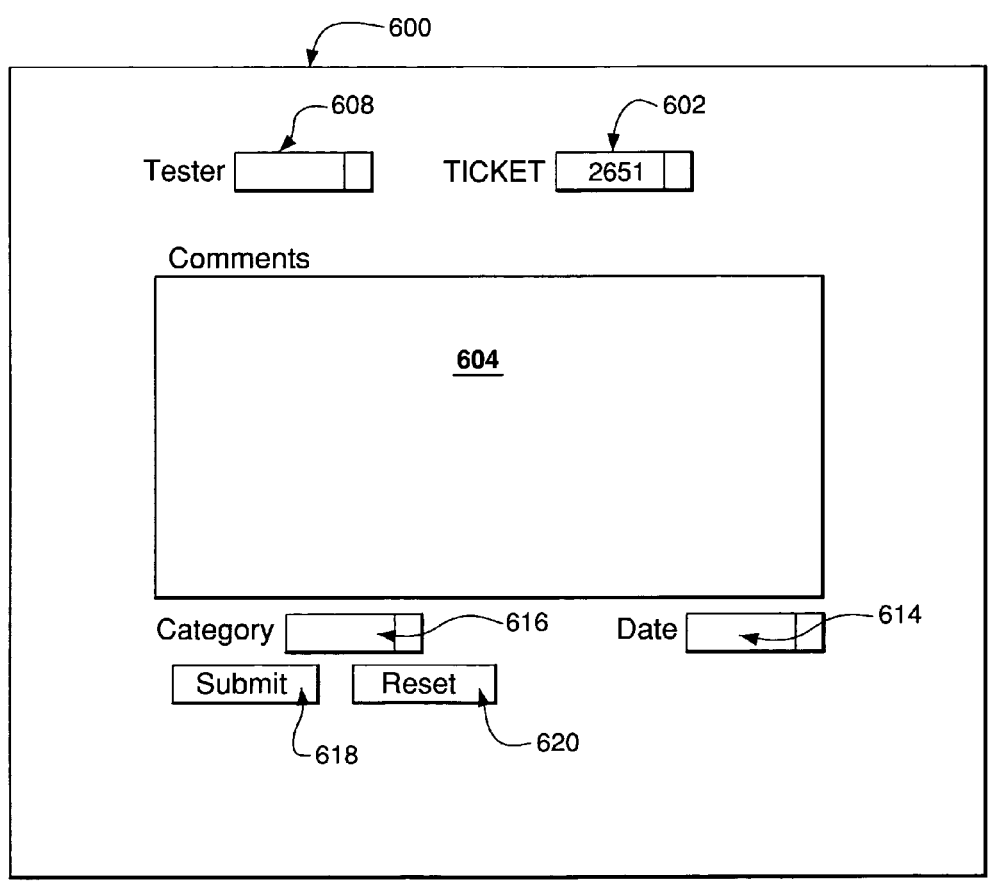
FIG. 5 is an exemplary user interface for entering a new function to be tested in accordance with one embodiment of the invention.

FIG. 4 illustrates a flow diagram concerning another aspect of the present invention. During the course of the testing process, a technician, at step 502, may come across a malfunctioning function that is not already listed in the database. In this case, the technician may enter a new trouble ticket. When a new trouble ticket is entered, the vendor may be automatically notified, such as by e-mail or page. In a preferred embodiment, an audible page is sent to the vendor database manager's paging device. To enter a new trouble ticket, the technician can choose an INPUT Ticket option at a software acceptance/regression testing application entry screen at step 504. FIG. 5 illustrates an exemplary screen for inputting a new ticket that may be displayed. At step 506 the technician is presented with a system-generated ticket number 602 and a text box preferably labeled "Comments" 604 in which the client technician can describe the problem he found. For example, at step 508 a technician (e.g. Robert) may enter "The access point window does not resize with Display menu, font changes. Consequently the entire access point information window is unavailable for viewing with small or normal font choices. Recommend resizing capability, for the access point information window. Or, at least, offer scroll bars on access point information window ONLY when the entire window is not viewable given the current display choice. Referred by Bart Caxin, ipage at bcaxin@whois.com."

The other fields available for input at this screen preferably are Tester 608, Date 614, and Category 616. There is also preferably a submit button 618 and a reset button 620.

According to one aspect of the invention, someone at the client facility removes the duplicate problems manually. For example, if two client technicians each find the same problem and enter it into the database, only one trouble ticket needs to be assigned. When duplicate trouble tickets are entered, one of the tickets is assigned to a technician to test and the others are marked as duplicates by selecting the "Duplicate" option in Status field 412. Tickets with "Duplicate" in status field 412 do not appear on the "Open Tickets" report.

In one embodiment the vendor workflow manager assigns the new trouble ticket to a vendor employee to fix. A fix-by date is determined and entered. A technician re-tests the problem on or after the fix-by date and enters the result of the new test. Trouble tickets are closed out when the purchaser technician notes "fixed" in the result field.

So far the discussion has addressed circumstances in which a new software product is being acceptance tested. Regression testing refers to the testing of new releases of a software product already in use.

Regression Testing

Frequently, a new release of presently owned or licensed software will be received by the client. For example, a new release may be delivered to the client from the vendor every six months. Typically, when a new release is installed, there are new functionalities of the software to be tested. Also typically in a new release functions that operated correctly in the previous release do not operate correctly in the new release. Typically, there are some functions that will be tested every time a new release is received because these functions are critical functions that simply must work correctly. Other functions will be tested every time a new release is received because the functions are error-prone for one reason or another. Other functions tested in the older release will not need to be tested in the new release. It would be inefficient to require manual re-input of functions to be tested that were already entered for a previous release. Hence a version re-test indicator in the database provides the means to generate new tickets in a new database for the new version. For example, prior to testing a new release, the existing database may be archived. A bulk change in MS ACCESS may be employed to change all the tickets containing "pass" or "fail" to "needs testing". Alternately, the version re-test indicator can be used to copy these records into new records in a database that contains testing results of more than one release of a software product. Alternately, the version indicator represents a means to identify functions to be retested, where the new testing information will be added to the original record. Prior to testing a new release, all the "pass" and "fail" tickets may be archived, printed out and reviewed. A bulk change in MS Access may be used to change the "pass" and "fail" to "Needs Testing". A tester may then select the tests that are assigned to the tester, read the comments from the previous tests performed and check to make sure that the functionality still works. Alternately, to initiate the processes described above, in one embodiment a project manager may select functions to be re-tested in a new release by setting version indicator (not shown) to a determined value.

Firewall Processing

Hence geographically dispersed vendor and client may each access a single database resident on a vendor or client server or other server via a restricted communications network such as an intranet. Whenever a client or vendor user attempts to access the software acceptance/regression testing software, the user id entered is compared with a list of authorized users. If the user id is not contained within the list of authorized users, the user is denied access to the software.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful mechanism for creating and maintaining a database accessible by means of a restricted network communications system, such as an intranet. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A method for tracking acceptance/regression testing of software via a communications network, the method comprising:
   receiving data representing a function of the software to be tested;
   storing the data representing the function of the software to be tested in an acceptance/regression testing database, the acceptance/regression testing database modifiable by a vendor of the software and by a client of the vendor, wherein a list of functions to be tested is entered into the testing database by the client;
   receiving an identifier of a technician assigned to test the function;
   storing the identifier in the acceptance/regression testing tracking database;
   receiving an indication of a result of the technician's testing of the function; and
   storing the indication in the acceptance testing tracking database.

2. The method of claim 1, wherein the data representing the function of the software to be tested is received from the vendor.

3. The method of claim 1, wherein the data representing the function of the software to be tested is received from the client of the vendor.

4. The method of claim 1, further comprising automatically assigning a ticket number to the function to be tested.

5. The method of claim 4, wherein the ticket number is a unique sequential number.

6. The method of claim 4, wherein the ticket number is computer-generated.

7. The method of claim 1, further comprising:
   receiving an indicator of a severity of a function to be tested; and
   storing the indicator of severity of the function in the database.

8. The method of claim 1, wherein the communications network is an intranet.

9. The method of claim 8, wherein only members of an authorized group have access to the acceptance/regression tracking application.

10. The method of claim 9, wherein the members of the authorized group comprise employees of the client.

11. The method of claim 10, wherein the employees of a client authorized to have access to the acceptance/regression tracking application are represented by a list of user identification codes.

12. The method of claim 9, wherein the members of an authorized group comprise employees of the vendor.

13. The method of claim 12, wherein the employees if a vendor authorized to have access to the acceptance/regression tracking application are represented by a list of user identification codes.

14. The method of claim 9, wherein the members of an authorized group comprise geographically diverse users.

15. A computer-readable medium containing computer-executable instructions for performing the method of claim 1.

16. A system for tracking acceptance/regression testing results, the system comprising:
   a client computing device communicatively coupled to a communications network;
   a server computing device communicatively to a client computing device via the communications network; and
   computer executable instructions stored on the server computing device for performing the following:
   receiving data representing a function of the software to be tested;
   storing the data representing the function of the software to be tested in an acceptance/regression testing database, the acceptance/regression testing database modifiable by a vendor of the software and a client of the vendor wherein a list of functions to be tested is entered into the testing database by the client;
   receiving an identifier of a technician assigned to test the function;
   storing the identifier in the acceptance/regression testing tracking database;
   receiving an indication of a result of the technician's testing of the function; and
   storing the indication in the acceptance testing tracking database.

17. The system of claim 16 wherein the communications network is the Internet.

18. The system of claim 16, wherein the communications network is an intranet.

* * * * *